No. 746,664. PATENTED DEC. 15, 1903.
A. C. BOURDEAU.
MEANS FOR MIXING CEREAL WITH MALT.
APPLICATION FILED MAR. 18, 1902.
NO MODEL.

Witnesses:

Inventor:
A. C. Bourdeau
By Elliott + Hopkins
Attys.

No. 746,664.

Patented December 15, 1903.

UNITED STATES PATENT OFFICE.

ARTHUR C. BOURDEAU, OF BATTLECREEK, MICHIGAN, ASSIGNOR TO MALTA VITA PURE FOOD COMPANY, OF JERSEY CITY, NEW JERSEY, A CORPORATION OF NEW JERSEY.

MEANS FOR MIXING CEREAL WITH MALT.

SPECIFICATION forming part of Letters Patent No. 746,664, dated December 15, 1903.

Application filed March 18, 1902. Serial No. 98,744. (No model.)

*To all whom it may concern:*

Be it known that I, ARTHUR C. BOURDEAU, a citizen of the United States, residing at Battlecreek, in the county of Calhoun and State of Michigan, have invented certain new and useful Improvements in Means for Mixing Cereal with Malt, of which the following is a full, clear, and exact specification.

My invention relates to an apparatus especially adapted for thoroughly commingling grain or cereal with the extract of malt or diastase and uniformly distributing throughout the mass the desired proportion of salt or other seasoning, if required; and my invention has for its primary object to provide a mixer which shall be of such construction that the cereal and the substance with which it is to be mixed may be thoroughly and uniformly commingled while the grain or cereal is in a swollen and very tender condition without danger of rendering the mass mushy or homogeneous.

With these ends in view my invention consists in certain features of novelty in the construction, combination, and arrangement of parts by which the said objects and certain other objects hereinafter appearing are attained, all as fully described with reference to the accompanying drawings and more particularly pointed out in the claims.

Figure 1:
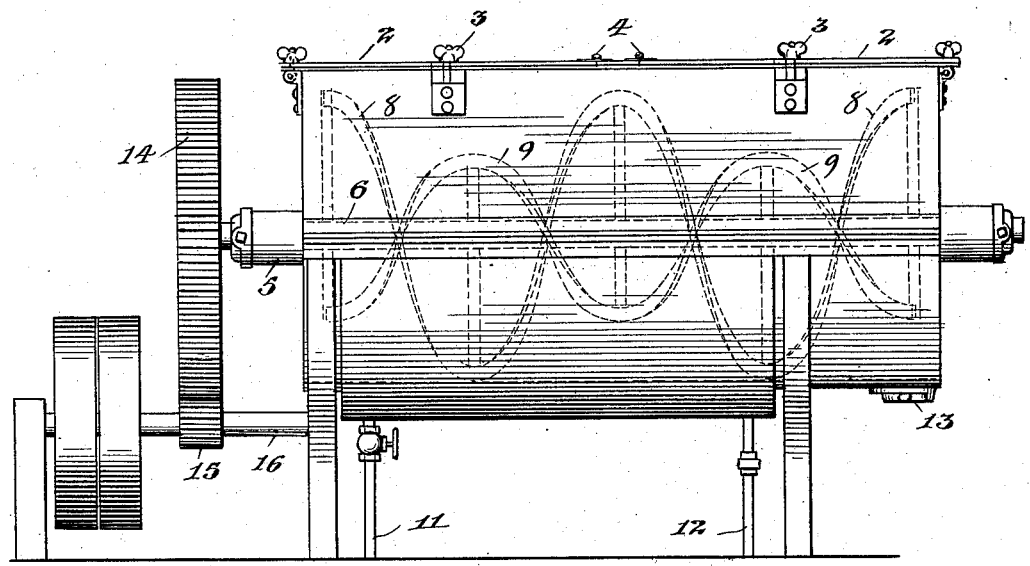
Figure 2:
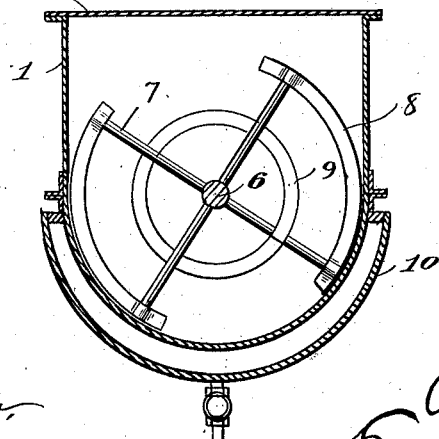

In the said drawings, Figure 1 is a side elevation of my improved mixer, and Fig. 2 is a cross-section thereof.

1 is a box or hopper, which may be provided with lids 2, having fastening-screws 3 and hinged at 4, so that the box or hopper may be tightly closed with capability or permitting ready access to its interior for the purpose of examining the operation and admitting or removing the material to be treated.

The lower side of the box or hopper 1 is of semicircular form, and journaled longitudinally in the box in suitable bearings 5 is a shaft 6, upon which are mounted a number of radial arms or spokes 7, which carry at their outer ends a spiral mixing-blade 8, having the form of an Archimedean screw, the same being very narrow as compared with the diameter of the hopper, but fitting closely to the cylindrical walls thereof, so that as the shaft 6 is revolved the screw will work the material from the bottom toward the end, allowing the material above to descend and take the place of the displaced material, which in turn will be worked toward the end, and so on, causing all the material in the hopper to work from end to end thereof and from top to bottom, the spiral character of the screw serving not only to push the material endwise, but to lift it at the end of the hopper and thereby enable it to work upward at one end. In order that this mixing may be more thorough without, however, mashing or crushing the kernels, a second Archimedean screw 9 may be secured on the arms or spokes 7, concentrically with and at a considerable distance from the screw 8 and which also serves to work the grain or material from end to end in the hopper.

In mixing cereal with malt extract after the same has been soaked or cooked it is desirable to heat the material to a temperature of from 85° to 140° Fahrenheit in order to cause the extract and the salt which is usually mixed therewith at this period to more intimately associate themselves with the cells of the grain. To this end the lower side of the cylindrical part of the mixer is provided with a steam or hot-water jacket 10, supplied at opposite ends with pipes 11 12, whereby circulation of steam or hot water may be maintained through the jacket.

The cylindrical portion of the hopper or box 1 protrudes at one end beyond the jacket 10 and is provided with a discharge-valve 13 for discharging the hopper at the conclusion of the mixing operation, the worm or mixing blades serving to work the material toward the discharge-valve.

The shaft 6 may be driven in any suitable way, such as by means of a gear-wheel 14, secured thereon and meshing with a pinion 15 on driving-shaft 16.

Having thus described my invention, what I claim as new therein, and desire to secure by Letters Patent, is—

In an apparatus for the purpose described, the combination of a hopper having a semicylindrical bottom, a shaft journaled in said hopper, arms radiating from said shaft, a horizontal spiral mixing-blade continuing throughout the length of said shaft and constituting an Archimedean screw, said blade being secured to the outer ends of said arms and arranged close to said bottom, and a second spiral mixing-blade surrounding said shaft and being arranged within and coterminous with the first said blade and of smaller diameter than the latter.

ARTHUR C. BOURDEAU.

Witnesses:
WM. F. NEALE,
A. C. WISNER.